(12) United States Patent
Kim et al.

(10) Patent No.: US 11,629,820 B2
(45) Date of Patent: Apr. 18, 2023

(54) LIQUEFIED HYDROGEN FILLING APPARATUS

(71) Applicant: HYLIUM INDUSTRIES, INC., Gyeonggi-do (KR)

(72) Inventors: Seo Young Kim, Gyeonggi-do (KR); Jai Hyun Choi, Gyeonggi-do (KR); Eun Yeob Cho, Gyeonggi-do (KR); Joshua Kim Schimpf, Gyeonggi-do (KR)

(73) Assignee: HYLIUM INDUSTRIES, INC.

( * ) Notice: Subject to any disclaimer, the term of this patent is extended or adjusted under 35 U.S.C. 154(b) by 336 days.

(21) Appl. No.: 16/931,990

(22) Filed: Jul. 17, 2020

(65) Prior Publication Data

US 2021/0285603 A1   Sep. 16, 2021

(30) Foreign Application Priority Data

Mar. 10, 2020  (KR) .......................... 10-2020-0029698

(51) Int. Cl.
*F17C 5/02*   (2006.01)
*F17C 13/04*  (2006.01)

(52) U.S. Cl.
CPC ................ *F17C 5/02* (2013.01); *F17C 13/04* (2013.01); *F17C 2205/0335* (2013.01); *F17C 2205/0388* (2013.01); *F17C 2221/012* (2013.01); *F17C 2227/04* (2013.01)

(58) Field of Classification Search
CPC .... F17C 5/02; F17C 13/04; F17C 2205/0335; F17C 2205/0388; F17C 2221/012; F17C 2227/04; F17C 2205/0382; F17C 2205/0391; F17C 2205/0329; F17C 2205/037; Y02E 60/32; F16K 3/314; F16K 2200/204; F16K 17/042; F16L 37/36; F16L 37/44; F16L 37/28
USPC .......................................................... 62/501
See application file for complete search history.

(56) References Cited

U.S. PATENT DOCUMENTS

| | | | | |
|---|---|---|---|---|
| 3,664,375 A | * | 5/1972 | Marette | F16L 37/23 137/614.04 |
| 5,429,155 A | * | 7/1995 | Brzyski | F16L 37/35 62/50.7 |
| 11,073,244 B2 | * | 7/2021 | Takezawa | F17C 13/045 |
| 11,262,012 B2 | * | 3/2022 | Jordan | F16L 37/47 |
| 2004/0050450 A1 | * | 3/2004 | Lambert | F16L 37/32 141/346 |

(Continued)

FOREIGN PATENT DOCUMENTS

EP  0039977 A1 * 11/1981

*Primary Examiner* — Timothy P. Kelly
*Assistant Examiner* — Stephanie A Shrieves
(74) *Attorney, Agent, or Firm* — Mendelsohn Dunleavy, P.C.

(57) ABSTRACT

Disclosed is a liquefied hydrogen filling apparatus configured such that connection between liquefied hydrogen injection lines is performed stepwise, whereby there is no concern of leakage of liquefied hydrogen the moment the liquefied hydrogen injection lines are connected to each other, and therefore it is possible to guarantee safety and to prevent loss of fuel. In addition, the state of connection between the liquefied hydrogen injection lines is securely maintained, whereby there is no concern of separation due to internal pressure at the time of filling or other external force, and therefore it is possible to perform safe filling.

15 Claims, 11 Drawing Sheets

(56) References Cited

U.S. PATENT DOCUMENTS

| | | | | |
|---|---|---|---|---|
| 2005/0247352 A1* | 11/2005 | Kamiya | ................ | F16L 37/565 |
| | | | | 137/614.04 |
| 2007/0155224 A1* | 7/2007 | Marot | ..................... | F16L 37/30 |
| | | | | 439/491 |
| 2012/0299291 A1* | 11/2012 | Kamiya | ................. | F16L 37/36 |
| | | | | 285/308 |
| 2018/0134147 A1* | 5/2018 | Takezawa | ............... | F16L 37/42 |
| 2021/0108750 A1* | 4/2021 | Moersch | ................ | F16L 37/23 |

* cited by examiner

LIQUEFIED HYDROGEN FILLING APPARATUS

CROSS-REFERENCE TO RELATED APPLICATION

This application claims priority from Korean Patent Application No. 10-2020-0029698, filed on Mar. 10, 2020, in the Korean Intellectual Property Office, the disclosure of which is incorporated herein by reference in its entirety.

BACKGROUND OF THE INVENTION

1. Field of the Invention

The present invention relates to a liquefied hydrogen filling apparatus, and more particularly to a liquefied hydrogen filling apparatus capable of more conveniently and safely filling liquefied hydrogen.

2. Description of the Related Art

Hydrogen, which is a clean energy source, has an advantage in that little pollutant is generated upon combustion. As a result, hydrogen may be applied to various fields, and has attracted considerable attention as driving fuel of a vehicle in recent years. In order to more efficiently use hydrogen, above all, it is important to establish technology capable of safely storing and treating hydrogen.

Meanwhile, examples of a vehicle using hydrogen as driving fuel include a hydrogen vehicle and a fuel cell electric vehicle (FCEV). The hydrogen vehicle is a vehicle configured such that hydrogen is supplied to an internal combustion engine in order to acquire driving force through ignition and direct combustion, and has the same principle as a general gasoline vehicle. On the other hand, the fuel cell electric vehicle (FCEV) has a structure in which electricity is generated through electrochemical reaction between hydrogen supplied from a hydrogen tank and oxygen in air supplied from an air compressor in a fuel cell stack and a motor is driven using the generated electricity.

In the hydrogen vehicle and the fuel cell electric vehicle, a hydrogen storage tank configured to receive and store hydrogen is one of the core components thereof. There are several kinds of storage tanks, and external hydrogen may be supplied into the storage tank through a receptacle. In the case in which the residual amount of hydrogen in the storage tank is reduced due to driving of the vehicle, the vehicle is moved to a hydrogen gas station such that hydrogen is supplied to the vehicle. At the hydrogen gas station, hydrogen stored in a storage tank is supplied to the vehicle using a nozzle.

However, a conventional filling apparatus has a structure in which a valve pin in a receptacle and a nozzle are simultaneously opened at once. The moment the nozzle is inserted into the receptacle, therefore, a very small amount of hydrogen may leak outside. Leakage of liquefied hydrogen means loss of fuel, and may cause fire depending on circumstances.

SUMMARY OF THE INVENTION

The present invention has been made in view of the above problems, and it is an object of the present invention to provide a liquefied hydrogen filling apparatus configured such that there is no concern of leakage of liquefied hydrogen the moment injection lines are connected to each other, whereby it is possible to guarantee safety and to prevent loss of fuel, and there is no concern of separation due to internal pressure at the time of filling or other external force, whereby it is possible to perform safe filling.

In accordance with the present invention, the above and other objects can be accomplished by the provision of a liquefied hydrogen filling apparatus including a receptacle mounted to a liquefied hydrogen storage tank, the receptacle having mounted therein a blocking unit configured to be opened by external force, and a multistage opening and closing device detachably coupled to the receptacle, the multistage opening and closing device having a housing configured to define a central path extending in the longitudinal direction, the housing having a receptacle reception portion configured to receive a portion of the receptacle, the receptacle reception portion being formed at the upper end of the housing, a locking means supported by the housing, the locking means being configured to fix the receptacle received in the receptacle reception portion to the housing, a sliding valve installed in the central path of the housing so as to be slidable in the longitudinal direction, a portion of the sliding valve extending outwards from the central path, the sliding valve being configured to be opened by external force transmitted from the receptacle, and a driving unit mounted to the lower end of the housing, the driving unit being configured to drive the locking means first in order to fix the receptacle, to move the sliding valve to the blocking unit such that the sliding valve is opened by reaction force from the blocking unit, and simultaneously to drive the sliding valve such that the sliding valve pushes open the blocking unit.

The receptacle may have a stationary duct provided with a guide path having a predetermined inner diameter, the stationary duct being provided on the outer circumferential surface thereof with a catching ring configured to be caught and supported by the locking means, and the blocking unit may have a first stationary valve, the first stationary valve including a valve casing fixed in the guide path, the valve casing defining a valve path, the valve casing having a step portion formed therein, the valve casing being configured to apply reaction force to the sliding valve, a movable shutter installed in the valve path, the movable shutter having an extension rod extending in the longitudinal direction and a blocking plate formed integrally with the extension rod, the blocking plate being configured to advance to or retreat from the step portion, the blocking plate being in tight contact with the step portion to block the valve path, the movable shutter being configured to be pushed by the sliding valve in order to open the step portion, and a spring configured to elastically support the blocking plate against the step portion.

A second stationary valve may be further installed in the guide path, the second stationary valve being arranged with respect to the first stationary valve in series, the second stationary valve being configured to be pushed by the extension rod so as to be opened simultaneously with the first stationary valve.

The locking means may include an elastic locker installed in the receptacle reception portion such that the position of the elastic locker is adjustable, the elastic locker being opposite the catching ring of the receptacle inserted in the receptacle reception portion, a spring configured to apply elastic force to the elastic locker such that the elastic locker is separated from the catching ring, and a locking realization unit configured to be movable rectilinearly in the state of wrapping the receptacle reception portion and to support the elastic locker against the receptacle through rectilinear movement in order to fix the receptacle or to allow action of the spring to be applied to the elastic locker such that the elastic locker is separated from the catching ring.

A plurality of side paths configured to open an inner space of the receptacle reception portion in the lateral direction may be formed in the receptacle reception portion, the elastic locker may be installed in each of the side paths so as to be turnable about a turning pin, the elastic locker being provided at the upper end thereof with a hook configured to fix the catching ring by catching the catching ring, and the spring may be an extension spring configured to connect the lower end of the elastic locker and the housing to each other.

The locking realization unit may include a locker support case configured to contact the outer circumferential surface of the receptacle reception portion surface-to-surface, the locker support case being provided at a position thereof corresponding to each of the side paths with a locker retreat recess defining a retreat space in which the elastic locker can be separated from the catching ring, and a case moving unit configured to move the locker support case such that the hook is pushed by the inner circumferential surface of the locker support case so as to protrude inwardly of the receptacle reception portion or to retreat into the locker retreat recess.

The sliding valve may have a tubular rectilinear body configured to abut the inner circumferential surface of the central path of the housing, the rectilinear body defining an in-body path configured to allow liquefied hydrogen to pass therethrough, a baffle plate fixed in the rectilinear body, the baffle plate having a plurality of baffle plate holes, a valve body including a push rod fixed to the baffle plate, the push rod extending to the first stationary valve, and a blocking disc formed integrally with the push rod, the blocking disc having a disc shape, an inner cylinder installed in the in-body path of the rectilinear body so as to be slidable, the inner cylinder being configured to receive the blocking disc and a portion of the push rod, the inner cylinder having an opening and closing hole configured to be opened and closed by the blocking disc such that liquefied hydrogen passes through the opening and closing hole, the inner cylinder being separated from the blocking disc by reaction force from the valve casing of the first stationary valve when the sliding valve is moved to the first stationary valve, and a spring configured to elastically support the inner cylinder against the first stationary valve such that the opening and closing hole is blocked by the blocking disc in the state in which no reaction force is applied.

The push rod of the valve body may be located on a straight line of the extension rod of the first stationary valve, whereby the sliding valve may be moved to the first stationary valve so as to be opened by the reaction force, and then the extension rod of the first stationary valve may be moved by pushing such that the blocking plate is separated from the step portion to open the first stationary valve.

The driving unit may include a reference plate fixed to the lower end of the housing, the reference plate being configured to allow the sliding valve to extend through a central through-hole, an upward-downward movement plate disposed so as to be spaced apart from the reference plate, a bending link unit configured to connect the reference plate and the upward-downward movement plate to each other so as to be capable of adjusting the distance therebetween, a movement limiting drum interposed between the sliding valve and the upward-downward movement plate, the movement limiting drum being configured to limit the distance of movement of the sliding valve relative to the upward-downward movement plate, and a lever configured to slide the sliding valve through adjustment of the distance between the reference plate and the upward-downward movement plate in order to open the sliding valve and the first stationary valve.

The upward-downward movement plate may be provided with a center hole, and the movement limiting drum may have a sliding portion fixed to the lower end of the rectilinear body, the sliding portion being configured to be slidable in the state of being received in the center hole, an upper-end catching portion fixed to the upper end of the sliding portion, the upper-end catching portion being configured to be caught by the upper surface of the upward-downward movement plate, and a lower-end catching portion located at the lower end of the sliding portion, the lower-end catching portion being configured to be caught by the lower surface of the upward-downward movement plate.

A drum support spring may be provided between the reference plate and the movement limiting drum, the drum support spring being configured to apply elastic force to the movement limiting drum in the state in which the drum support spring is supported by the reference plate, the drum support spring having a standard configured such that the lower-end catching portion abuts the lower surface of the upward-downward movement plate in the state in which the upward-downward movement plate is maximally spaced apart from the reference plate.

The case moving unit may include a plurality of connecting rods extending parallel to the housing, the upper end of each of the connecting rods being fixed to the locker support case, the lower end of each of the connecting rods being fixed to the upward-downward movement plate through the reference plate.

The lever may be configured to perform a first step operation in which the lever moves the upward-downward movement plate to the reference plate until the upper surface of the upward-downward movement plate reaches the upper-end catching portion such that the locker support case supports the elastic locker against the receptacle, and the lever may also be configured to perform a second step operation in which the lever moves the upward-downward movement plate to the reference plate again after completion of the first step operation such that the upward-downward movement plate pushes the sliding valve to the first stationary valve through the movement limiting drum, whereby the sliding valve is moved to the first stationary valve.

The bending link unit may include a plurality of unit links, one end of each of the unit links being connected to a corresponding one of the reference plate and the upward-downward movement plate via a support pin, and a link pin configured to connect the other ends of the unit links to each other.

The lever may be installed at each end of the upward-downward movement plate, and the lever may include a pair of extension portions turnably installed at an end of the upward-downward movement plate, power transmission portions, each of the power transmission portions being connected to a corresponding one of the extension portions so as to have an acute angle therebetween, each of the power transmission portions being configured to receive turning moment of a corresponding one of the extension portions, and a bending rod configured to connect ends of the power transmission portions to each other and to transmit the turning moment of each of the extension portions to the bending link unit such that the bending link unit is bent in order to adjust the distance between the reference plate and the upward-downward movement plate.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Hereinafter, an embodiment of the present invention will be described in more detail with reference to the accompanying drawings.

A liquefied hydrogen filling apparatus according to the present invention is capable of more safely and easily filling liquefied hydrogen through stepwise operations. The liquefied hydrogen filling apparatus basically includes a receptacle mounted to a liquefied hydrogen storage tank, the receptacle having mounted therein a blocking unit configured to be opened by external force, and a multistage opening and closing device detachably coupled to the receptacle, the multistage opening and closing device having a housing configured to define a central path extending in the longitudinal direction, the housing having a receptacle reception portion configured to receive a portion of the receptacle, the receptacle reception portion being formed at the upper end of the housing, a locking means supported by the housing, the locking means being configured to fix the receptacle received in the receptacle reception portion to the housing, a sliding valve installed in the central path of the housing so as to be slidable in the longitudinal direction, a portion of the sliding valve extending outwards from the central path, the sliding valve being configured to be opened by external force transmitted from the receptacle, and a driving unit mounted to the lower end of the housing, the driving unit being configured to drive the locking means first in order to fix the receptacle, to move the sliding valve to the blocking unit such that the sliding valve is opened by reaction force from the blocking unit, and simultaneously to drive the sliding valve such that the sliding valve pushes open the blocking unit.

Figure 1:
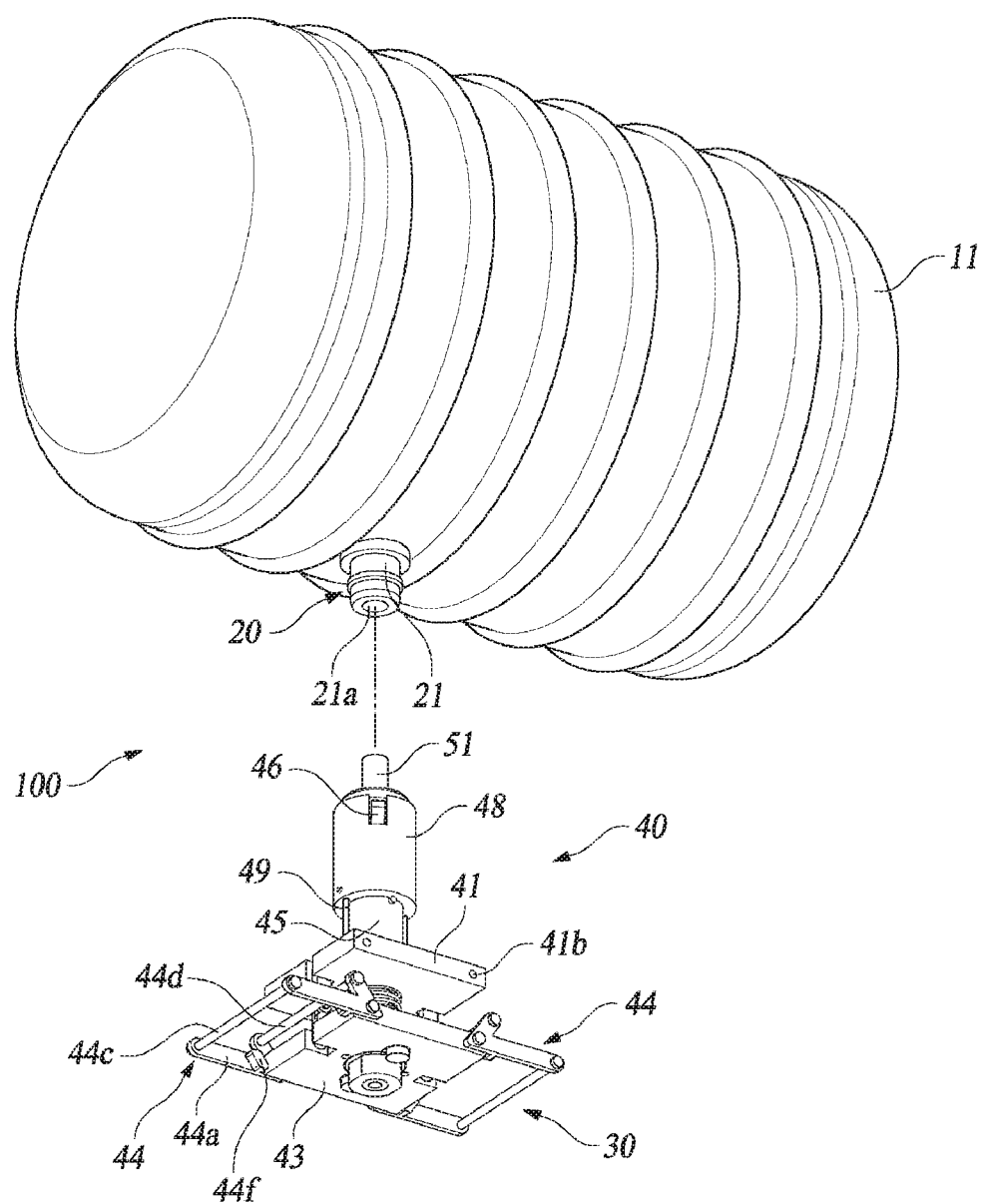
FIG. 1 is an exploded perspective view showing an application example of a liquefied hydrogen filling apparatus according to an embodiment of the present invention.
Figure 2:
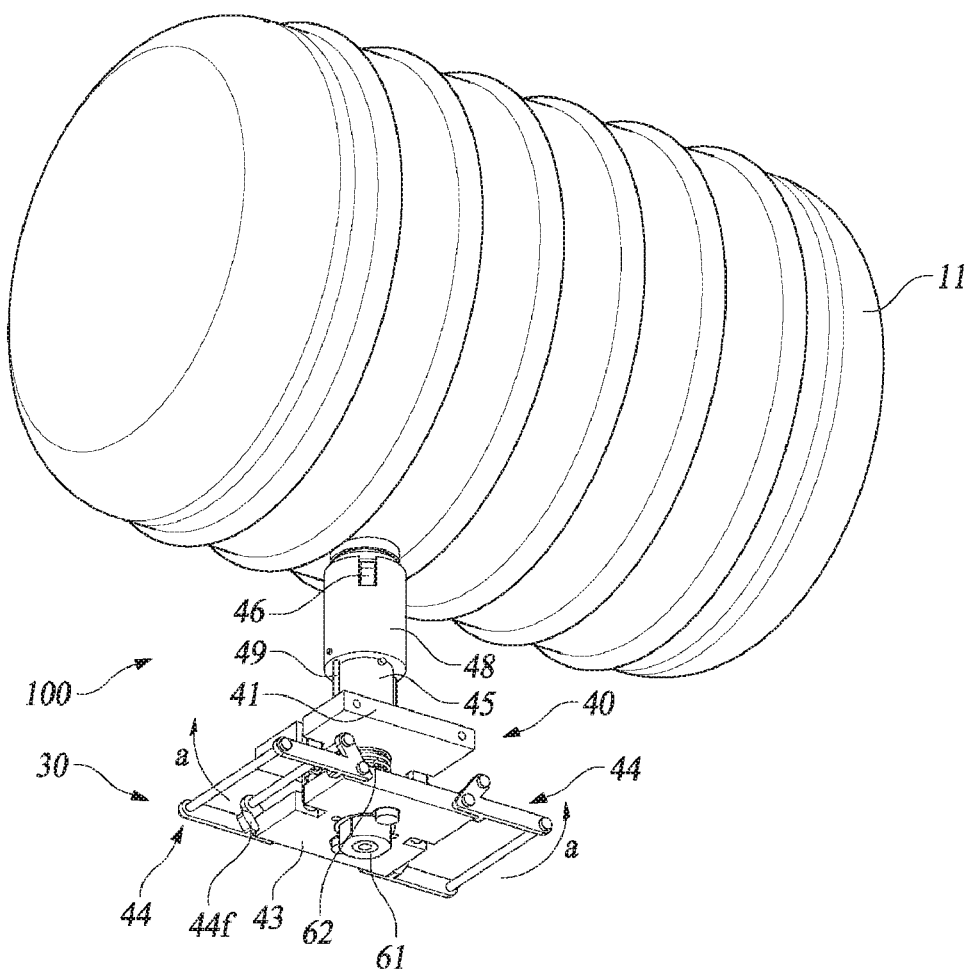
FIG. 2 is a perspective view showing the state in which a multistage opening and closing device is connected to a receptacle shown in FIG. 1.
Figure 3:
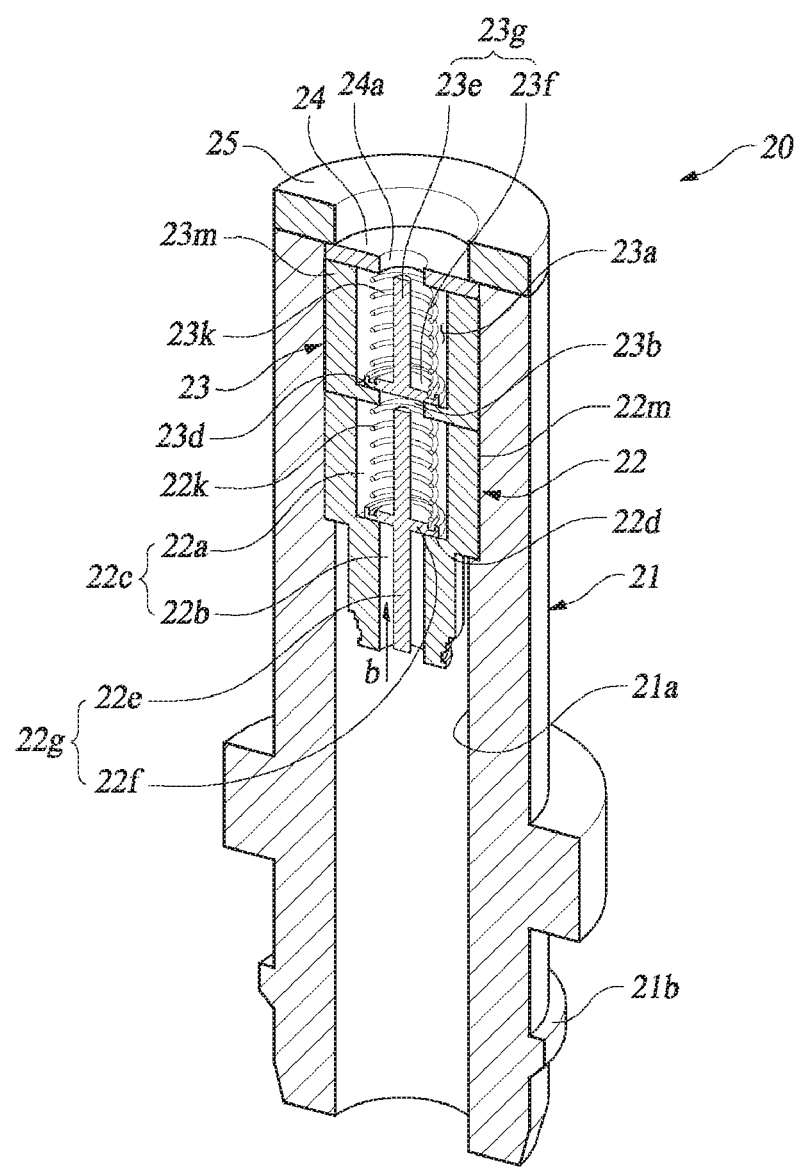
FIG. 3 is a view illustrating the internal structure of the receptacle shown in FIG. 1.
Figure 4:
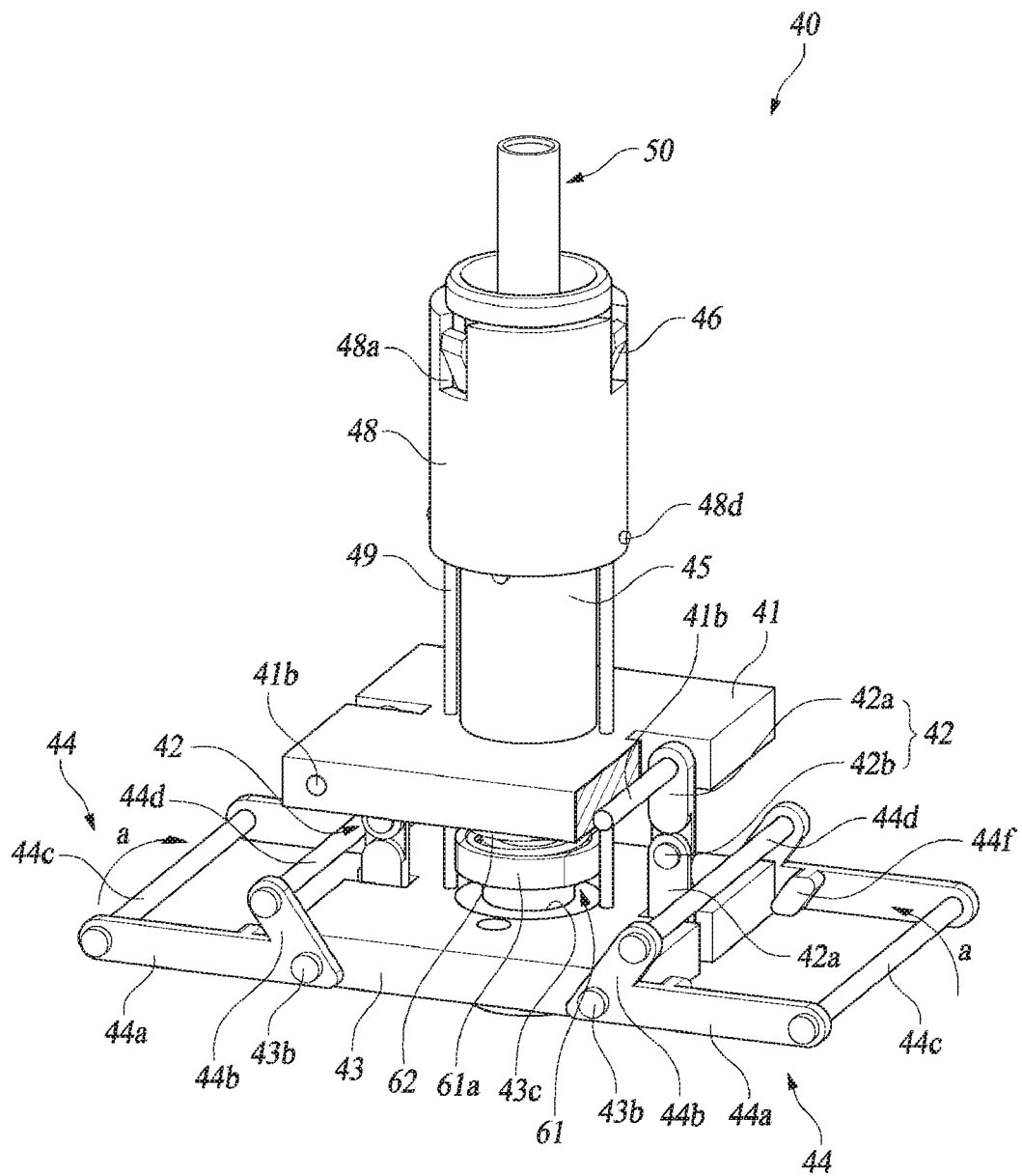
FIG. 4 is a perspective view separately showing the multistage opening and closing device of FIG. 1.
Figure 5:
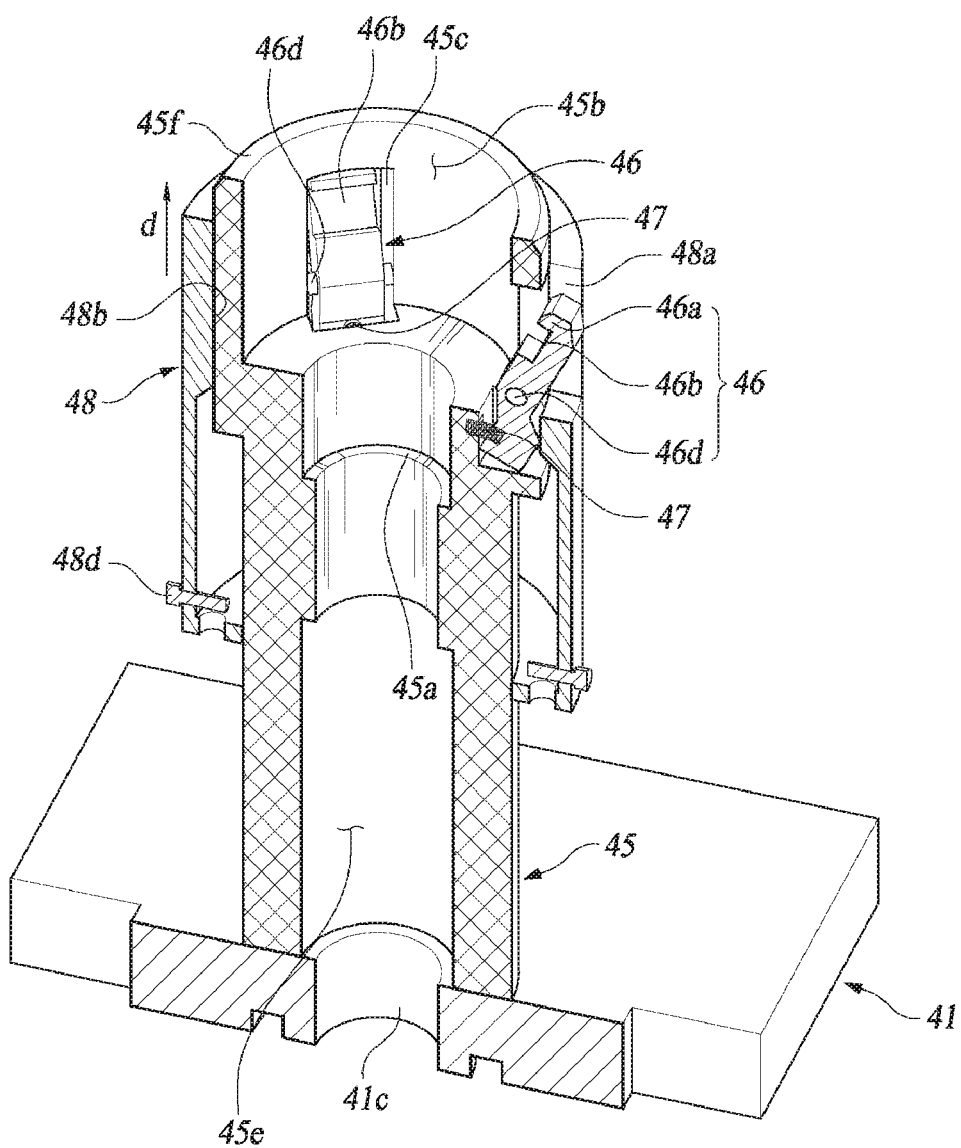
FIG. 5 is a view showing the internal structures of a housing and an upward-downward movement case of FIG. 4.

FIG. 1 is an exploded perspective view showing an application example of a liquefied hydrogen filling apparatus 100 according to an embodiment of the present invention, and FIG. 2 is a perspective view showing the state in which a multistage opening and closing device is connected to a receptacle shown in FIG. 1. In addition, FIG. 3 is a view illustrating the internal structure of the receptacle shown in FIG. 1, and FIG. 4 is a perspective view separately showing the multistage opening and closing device of FIG. 1. In addition, FIG. 5 is a view illustrating the internal structures of a housing and an upward-downward movement case of FIG. 4.

As shown, the liquefied hydrogen filling apparatus according to the embodiment of the present invention 100 includes a receptacle 20 and a multistage opening and closing device 40. The receptacle 20, which is a duct fixed to one side of a storage tank 11, serves to guide liquefied hydrogen supplied from the outside through the multistage opening and closing device 40 into the storage tank 11.

The multistage opening and closing device 40 is coupled to receptacle (for the purpose of filling of liquefied hydrogen). When a lever 44 of the multistage opening and closing device 40 is turned in the direction indicated by arrow a, coupling of the multistage opening and closing device 40 to the receptacle 20 is completed first, and then an internal path is opened, whereby filling is performed. Since filling is performed after coupling between the receptacle 20 and the multistage opening and closing device 40 is completed, there is no concern of the multistage opening and closing device 40 being separated from the receptacle 20 due to internal pressure at the time of filling, whereby leakage of liquefied hydrogen is prevented.

As shown in FIG. 3, the receptacle 20 has a stationary duct 21, a blocking unit, a support plate 24, and a fixing cap 25.

The stationary duct 21 is a rectilinear pipe type member provided with a guide path 21a having a predetermined inner diameter, and has a catching ring 21b formed on the outer circumferential surface thereof. The catching ring 21b is a ring-shaped protrusion extending along the outer circumferential surface of the stationary duct 21 such that opposite ends thereof are joined with each other. The catching ring 21b fixes a hook 46a by catching the hook 46a in the state of being inserted in a ring reception recess 46b of an elastic locker 46 shown in FIG. 5.

The blocking unit has a first stationary valve 22 and a second stationary valve 23.

The first stationary valve 22 includes a valve casing 22m, a movable shutter 22g, and a spring 22k. The valve casing 22m is fixed in the guide path 21a, and defines a valve path 22c configured to allow liquefied hydrogen to pass therethrough. The valve path 22c is a space including a large diameter portion 22a and a small diameter portion 22b. The large diameter portion 22a is a space having a larger inner diameter than the small diameter portion 22b, and a step portion 22d is formed between the large diameter portion 22a and the small diameter portion 22b.

The movable shutter 22g and the spring 22k are located in the valve path 22c. The movable shutter 22g is an element including an extension rod 22e and a blocking plate 22f. The extension rod 22e is a round bar-shaped member rectilinearly extending in the longitudinal direction, and is located on a straight line of a push rod 53a (see FIG. 7), a description of which will follow. The blocking plate 22f is formed in a disc shape having a predetermined diameter, and may advance to or retreat from the step portion 22d. When the blocking plate 22f comes into tight contact with the step portion 22d, flow of liquefied hydrogen through the stationary duct 21 is blocked.

The spring 22k elastically supports the blocking plate 22f against the step portion 22d. The blocking plate 22f remains in tight contact with the step portion 22d to prevent leakage of pressure from the storage tank 11 unless external force is applied.

The second stationary valve 23 is disposed in the guide path 21a so as to be arranged with respect to the first stationary valve 22 in series, and is opened simultaneously with the first stationary valve 22. Like the first stationary valve 22, the second stationary valve 23 is a constantly closed valve.

The second stationary valve 23 includes a valve casing 23m, a movable shutter 23g, and a spring 23k. The valve casing 23m defines a valve path 23a open upwards, and has a communication hole 23b formed in the lower part thereof. The communication hole 23b is a hole configured to connect the large diameter portion 22a and the valve path 23a to each other. The bottom of the valve casing 23m is a step portion 23d, which is in tight contact with a blocking plate 23f of the movable shutter 23g.

The movable shutter 23g has an extension rod 23e located on the same axis as the extension rod 22e of the first stationary valve 22 and a disc-shaped blocking plate 23f. The blocking plate 23f is elastically pushed against the step portion 23d by the spring 23k. When the movable shutter 23g is moved in the direction indicated by arrow b, the blocking plate 23f is pushed upwards by the extension rod 23e to open the communication hole 23b when viewed in the figure. At ordinary times, however, the blocking plate 23f blocks the communication hole 23b to prevent leakage of pressure from the storage tank 11.

The support plate 24 is a member that has a predetermined thickness and is provided in the center thereof with a hole 24a, and supports the spring 23k downwards. In addition, the fixing cap 25 is coupled to the upper end of the stationary duct 21, and prevents separation of the support plate 24.

Figure 6:
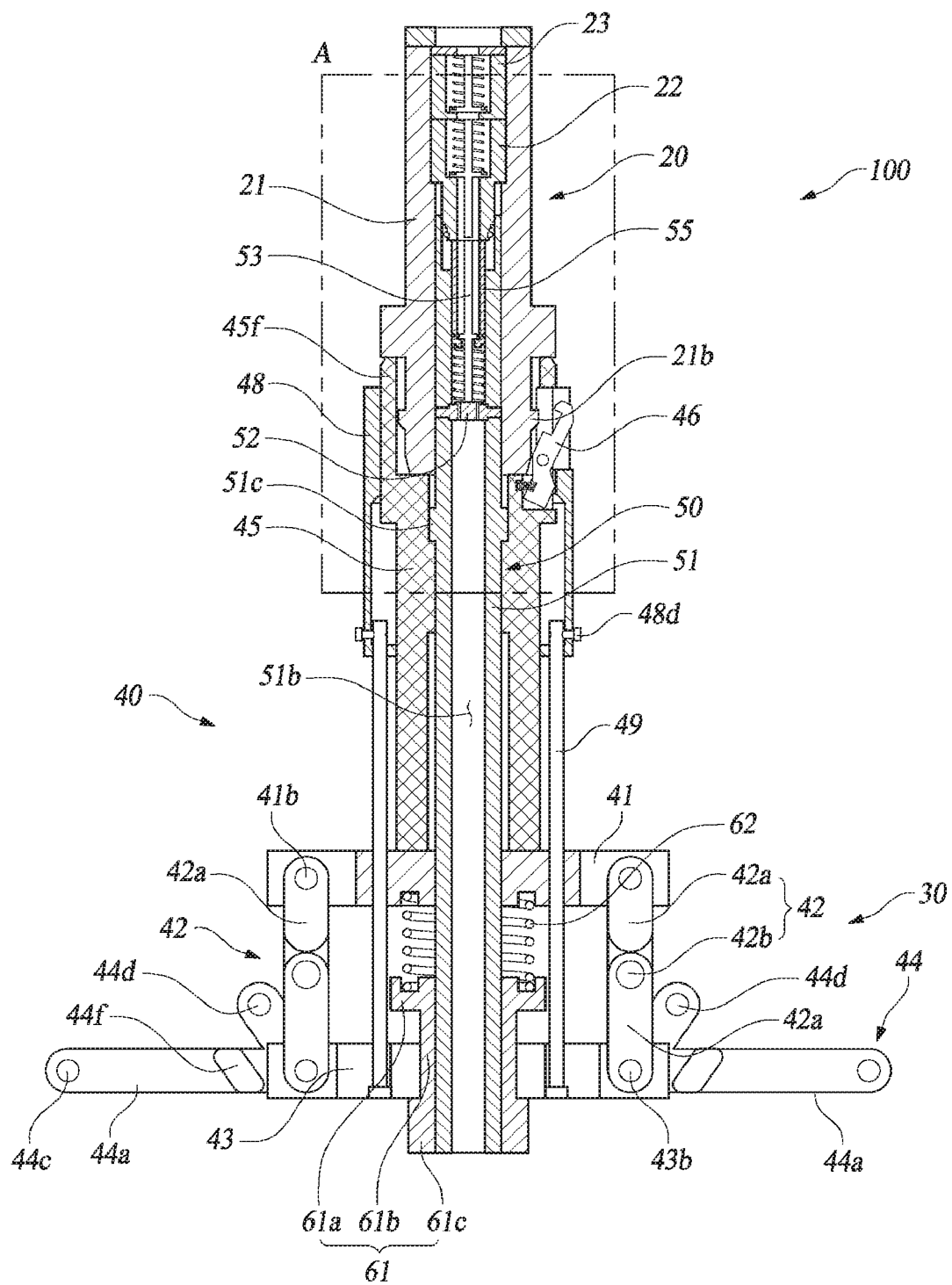
FIGS. 6 to 11 are sectional views illustrating the operation of the liquefied hydrogen filling apparatus according to the embodiment of the present invention.

Meanwhile, the multistage opening and closing device 40 includes a housing 45, a locking means, a sliding valve 50, and a driving unit 30 (see FIG. 6). The housing 45 has a structure shown in FIG. 5.

As shown in FIG. 5, the housing 45 defines a central path 45e extending in the longitudinal direction, and has a receptacle reception portion 45f configured to receive a portion of the receptacle 20, which is formed at the upper end thereof when viewed in the figure. The housing 45 supports the sliding valve 50 in the central path 45e so as to be slidable. Reference symbol 45a indicates a catching projection configured to support the sliding valve 50.

Opposite ends of the sliding valve 50 are exposed from the housing 45 in the state in which the sliding valve 50 is received in the housing 45. The portion of the sliding valve 50 extending to above the housing 45 is inserted into the guide path 21a of the receptacle 20, and the portion of the sliding valve 50 extending to below the housing 45 is coupled to the driving unit 30.

Figure 7:
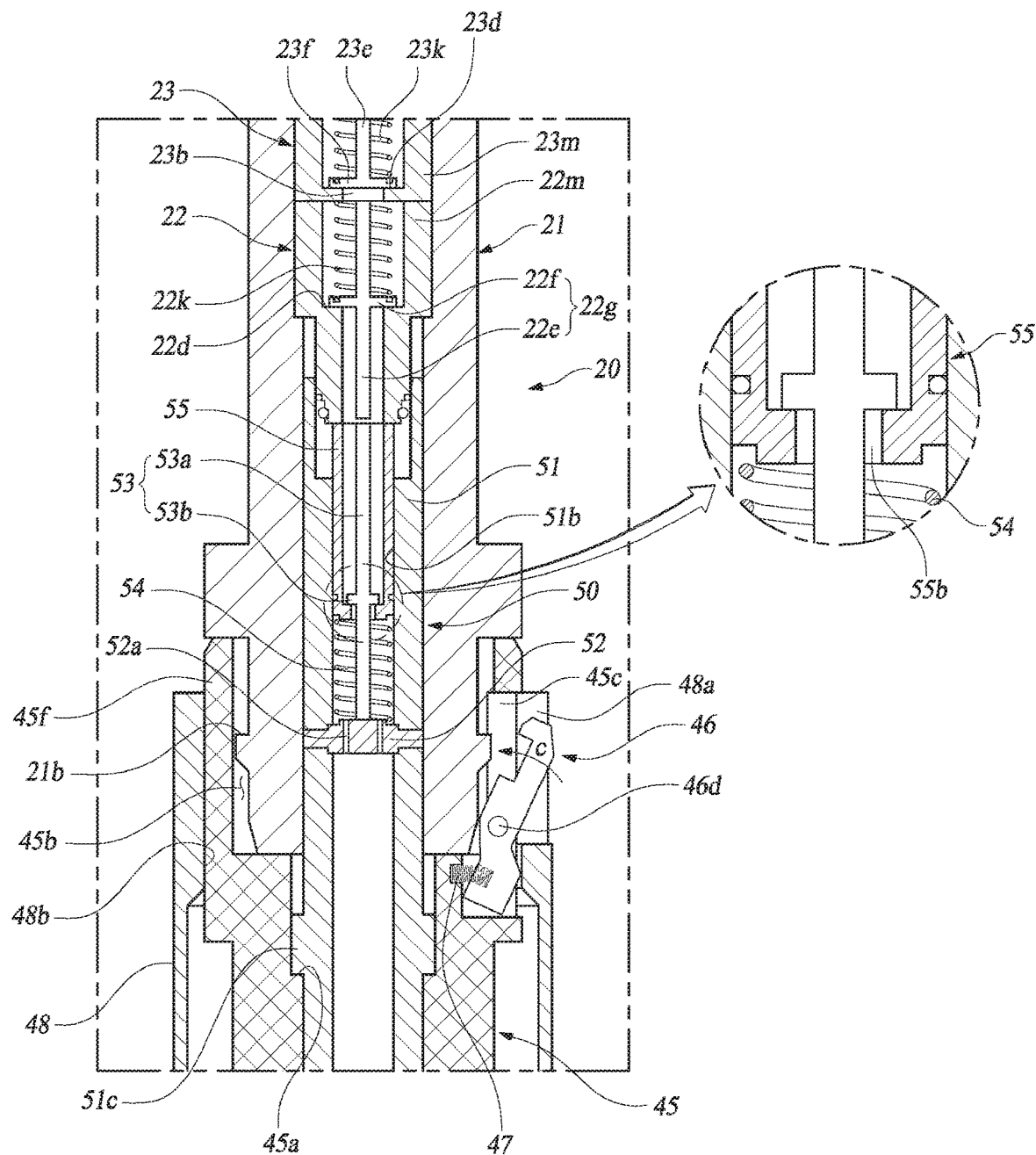

The receptacle reception portion 45f has a predetermined inner diameter, and defines a receptacle reception space 45b open upwards. As shown in FIG. 7, a portion of the stationary duct 21 is received in the receptacle reception space 45b.

In addition, three side paths 45c are provided in the receptacle reception portion 45f. Each of the side paths 45c is a quadrangular hole open in the radial direction, and turnably receives the elastic locker 46. The elastic locker 46, which is a portion of the locking means, is turned in the direction indicated by arrow c of FIG. 7 to fix the catching ring 21b by catching the catching ring 21b. As long as the catching ring 21b is caught by the elastic locker 46, there is no concern of the stationary duct 21 being separated from the receptacle reception space 45b.

A turning pin 46d is located at approximately the middle part of the elastic locker 46. Opposite ends of the turning pin 46d are supported by the receptacle reception portion 45f in the state in which the turning pin 46d extends through the elastic locker 46.

A hook 46a and a ring reception recess 46b are provided at the upper end of the elastic locker 46. The ring reception recess 46b is a recess configured to receive the catching ring 21b. In addition, the hook 46a is a protrusion configured to fix the upper surface of the catching ring 21b received in the ring reception recess 46b by catching the upper surface of the catching ring 21b. As shown in FIG. 7, the catching ring 21b is located at the height at which the catching ring 21b is caught by the hook 46a in the state in which the stationary duct 21 is received in the receptacle reception space 45b.

In addition, a locking spring 47 is provided at the lower end of the elastic locker 46. The locking spring 47 is an extension coil spring, and pulls the lower end of the elastic locker 46 in the state in which one end of the locking spring 47 is connected to the housing and the other end of the locking spring 47 is connected to the lower end of the elastic locker 46. The hook 46a is elastically biased in the outward direction of each of the side paths 45c by action of the locking spring 47.

The locking means further includes a locking realization unit. The locking realization unit has a locker support case 48 and a case moving unit. The locker support case 48 is formed so as to have a cylindrical shape, wraps the outer circumferential surface of the housing 45, and is moved rectilinearly in the direction indicated by arrow d of FIG. 5 or in the opposite direction by the case moving unit. The inner circumferential surface of the locker support case 48 contacts the outer circumferential surface of the receptacle reception portion 45f surface-to-surface.

A plurality of locker retreat recesses 48a is provided in the locker support case 48. The locker retreat recesses 48a are recesses that correspond one-to-one to the side paths 45c and open in the radial direction and upwards. Each of the locker retreat recesses 48a defines a retreat space in which the elastic locker 46 can be separated from the catching ring 21b. That is, the hook 46a is separated from the catching ring 21b in the state in which no external force is applied to the elastic locker 46.

When being moved in the direction indicated by arrow d, the locker support case 48 pushes each elastic locker 46 in the direction indicated by arrow c of FIG. 7 such that the hook 46a supports the catching ring 21b by catching the catching ring 21b. The inner circumferential surface of the locker support case 48 serves as a locker support surface 48b configured to support the elastic locker 46.

When the locker support case 48, which has been moved upwards in the direction indicated by arrow d, is moved downwards, the elastic locker 46 is separated from the locker support surface 48b and is then inserted into the locker retreat recess 48a.

The case moving unit moves the locker support case 48 in the direction indicated by arrow d or in the opposite direction, and has two connecting rods 49. The connecting rods 49 are located about the housing 45 so as to be opposite each other, and each of the connecting rods 49 is a round bar-shaped member extending parallel to the housing 45. As shown in FIG. 6, the upper end of the connecting rod 49 is fixed to the locker support case 48, and the lower end of the connecting rod 49 is fixed to an upward-downward movement plate 43, a description of which will follow. When the upward-downward movement plate 43 is moved to a reference plate 41, the connecting rod 49 moves the locker support case 48 upwards in the direction indicated by arrow d. The upper end of the connecting rod 49 is detachably connected to the locker support case 48 via a fixing screw 48d.

Meanwhile, the sliding valve 50 is a pipe type valve installed in the central path 45e of the housing 45 so as to be slidable in the longitudinal direction, and the opposite ends of the sliding valve 50 extend outwards from the central path 45e, as described above. The upper end of the sliding valve 50 is inserted into the guide path 21a of the receptacle 20, and the driving unit 30 is installed at the lower end of the sliding valve 50. In the following description, the upper end and the lower end will be defined based on the figure for convenience of description.

The structure of the sliding valve 50 will be described with reference to FIGS. 6 and 7. As shown, the sliding valve 50 has a rectilinear body 51, a baffle plate 52, a valve body 53, an inner cylinder 55, and a cylinder seat spring 54.

The rectilinear body 51 is a tubular member that contacts the inner circumferential surface of the central path 45e of the housing 45 surface-to-surface and defines an in-body path 51b configured to allow liquefied hydrogen to pass therethrough. In addition, an outer protrusion 51c configured to be caught by the catching projection 45a is formed on the outer circumferential surface of the rectilinear body 51.

The baffle plate 52 is a disc-shaped member fixed in the rectilinear body 51, and has a plurality of baffle plate holes 52a. Each of the baffle plate holes 52a is a through-hole configured to allow liquefied hydrogen to pass therethrough.

The valve body 53 includes a push rod 53a fixed to the central part of the baffle plate 52, the push rod 53a extending to the first stationary valve 22, and a blocking disc 53b. The push rod 53a is located on a straight line of the extension rod 22e of the first stationary valve 22. The push rod 53a and the extension rod 22e, each of which is a round bar-shaped member, have the same central axis. The blocking disc 53b is a disc-shaped member having a predetermined thickness and diameter, and blocks an opening and closing hole 55b of the inner cylinder 55.

The cylinder seat spring 54 elastically supports the inner cylinder 55 against the valve casing 22m in the state of being interposed between the baffle plate 52 and the inner cylinder 55.

The inner cylinder 55 is a tubular member having a predetermined diameter, and is movable in the longitudinal direction in the state of being in surface-to-surface contact with the inner circumferential surface of the in-body path 51b. In addition, the inner cylinder 55 has an opening and closing hole 55b configured to allow the push rod 53a to extend therethrough. The opening and closing hole 55b is opened and closed by the blocking disc 53, and also serves as a path configured to allow liquefied gas to pass therethrough.

Figure 11:
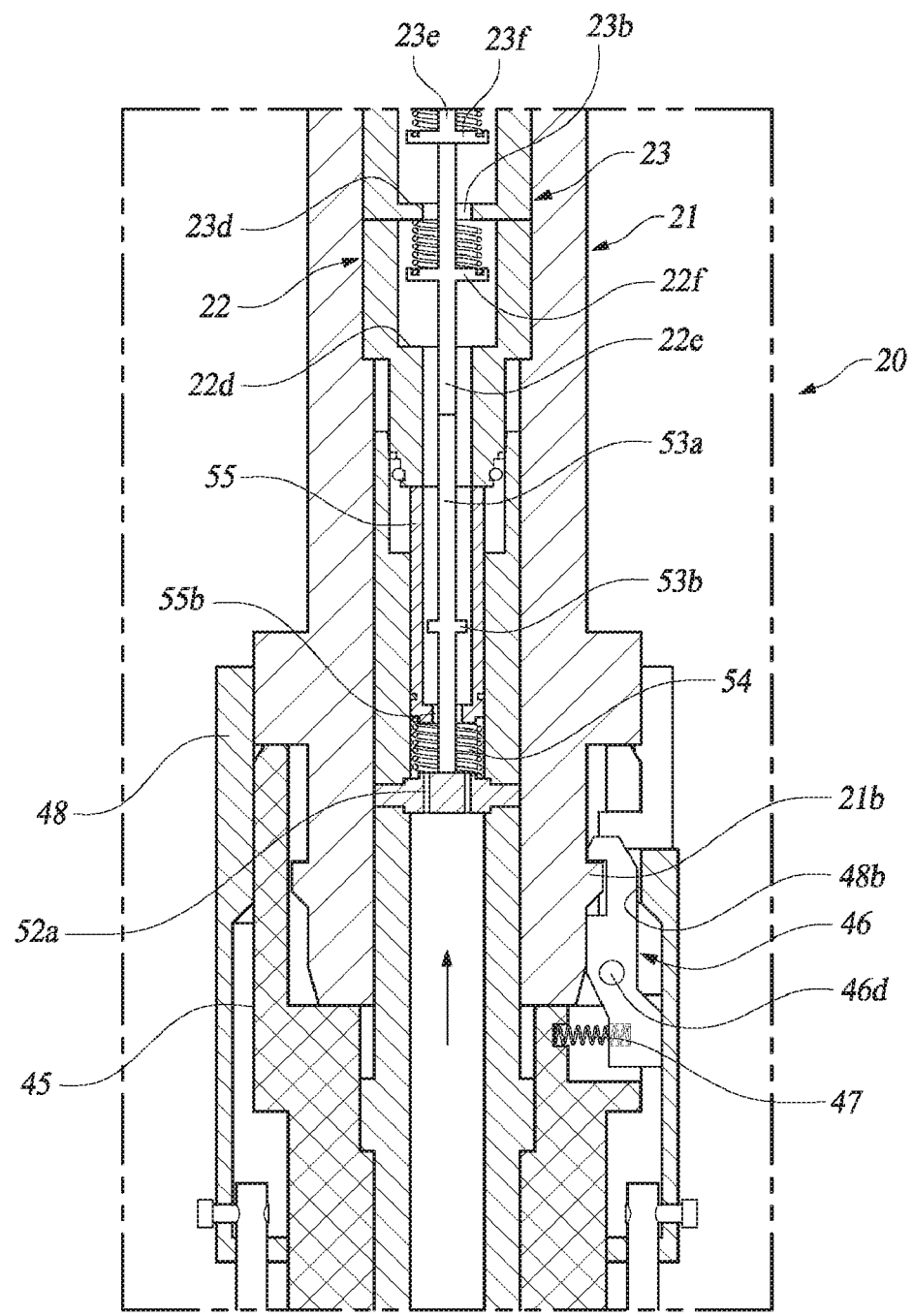

When the sliding valve 50 is moved to the first stationary valve and the inner cylinder 55 is pushed to the baffle plate 52 by reaction force generated as the result of being stopped by the valve casing 22m, as shown in FIG. 11, the opening and closing hole 55b is separated from the blocking disc 53, whereby the opening and closing hole 55b is opened.

Meanwhile, the driving unit 30 serves to fix the receptacle 20 and the multistage opening and closing device 40 and to open the sliding valve 50 and the first and second stationary valves 22 and 23 after fixing is completed. In other words, the driving unit 30 fixes the receptacle in the receptacle reception portion 45f first, and then moves the sliding valve 50 to the first stationary valve 22, whereby the sliding valve 50 is opened by reaction force from the first stationary valve 22, and at the same time the first stationary valve 22 is also opened.

The driving unit 30 has a reference plate 41, an upward-downward movement plate 43, a bending link unit 42, a movement limiting drum 61, a drum support spring 62, and a lever 44.

The reference plate 41 is a quadrangular plate having a predetermined thickness, is fixed to the lower end of the housing 45, and has a central through-hole 41c formed in the central part thereof. The central through-hole 41c is a hole configured to allow the rectilinear body 51 of the sliding valve 50 to extend therethrough.

In addition, the upward-downward movement plate 43 is a quadrangular plate having a predetermined thickness, like the reference plate 41, and is connected to the reference plate 41 via the bending link unit 42. A center hole 43c is formed in the central part of the upward-downward movement plate 43. The center hole 43c is a hole configured to receive a sliding portion 61b of the movement limiting drum 61.

The bending link unit 42 is configured to connect the reference plate 41 and the upward-downward movement plate 43 to each other so as to be capable of adjusting the distance therebetween, and includes unit links 42a connected to the reference plate 41 and the upward-downward movement plate 43 via support pins 41b and 43b and a link pin 42b configured to interconnect the unit links 42a. Two unit links 42a are bent about the link pin 42b when the distance between the reference plate 41 and the upward-downward movement plate 43 is decreased.

The movement limiting drum 61 is interposed between the end of the rectilinear body 51 of the sliding valve 50 and the upward-downward movement plate 43, and serves to limit the distance of movement of the sliding valve relative to the upward-downward movement plate.

The movement limiting drum 61 includes a sliding portion 61b, an upper-end catching portion 61a, and a lower-end catching portion 61c. The sliding portion 61b is a portion that is fixed to the outer circumferential surface of the rectilinear body 51 and is received in the center hole 43c. The sliding portion 61b is slidable upwards and downwards in the state of being received in the center hole 43c.

The upper-end catching portion 61a is a portion that is formed at the upper end of the sliding portion 61b and is configured to be caught by the upper surface of the upward-downward movement plate 43. In addition, the lower-end catching portion 61c is a portion that is formed at the lower end of the sliding portion 61b and is configured to be caught by the lower surface of the upward-downward movement plate 43. Each of the upper-end catching portion 61a and the lower-end catching portion 61c is formed so as to have a ring shape.

In addition, the drum support spring 62 is installed between the reference plate 41 and the movement limiting drum 61. The drum support spring 62 serves to apply elastic force to the movement limiting drum 61 in the state in which opposite ends of the drum support spring 62 are fixed to the reference plate 41 and movement limiting drum 61. In particular, as shown in FIG. 6, the drum support spring 62 has a standard configured such that the lower-end catching portion 61c abuts the lower surface of the upward-downward movement plate 43 in the state in which the upward-downward movement plate 43 is maximally spaced apart from the reference plate 41. In other words, the movement limiting drum 61 is suspended from the drum support spring 62.

Meanwhile, the lever 44 serves to slide the sliding valve 50 through adjustment of the distance between the reference plate 41 and the upward-downward movement plate 43 to fix the receptacle 20 first and to open the sliding valve 50 and the first and second stationary valves 22 and 23. When the sliding valve 50 is moved upwards, as described above, the sliding valve 50 is opened by reaction force from the valve casing 22m of the first stationary valve 22, and the first stationary valve 22 is pushed open by the valve body 53 of the sliding valve 50. In addition, the second stationary valve 23 is opened and closed in response to opening and closing of the first stationary valve 22.

That is, the lever 44 moves the upward-downward movement plate 43 to the reference plate 41 until the upper surface of the upward-downward movement plate 43 reaches the upper-end catching portion 61a such that the locker support case 48 supports the elastic locker 46 against the receptacle 20, which is referred to as a first step operation.

Subsequently, the lever 44 moves the upward-downward movement plate 43 to the reference plate 41 again such that the upward-downward movement plate 43 moves the upper-end catching portion 61a upwards to push the sliding valve to the first stationary valve such that the sliding valve is moved to the first stationary valve, which is referred to as a second step operation.

The lever 44 is turnably linked to each end of the upward-downward movement plate 43 via a support pin 43b. The support pin 43b is shared by the lever 44 and the unit link 42a.

As shown in FIG. 4, the lever 44 has an extension portion 44a, a power transmission portion 44b, a handle 44c, and a bending rod 44d. Ends of the extension portion 44a and the power transmission portion 44b are connected to each other via the handle 44c and the bending rod 44d.

Figure 8:
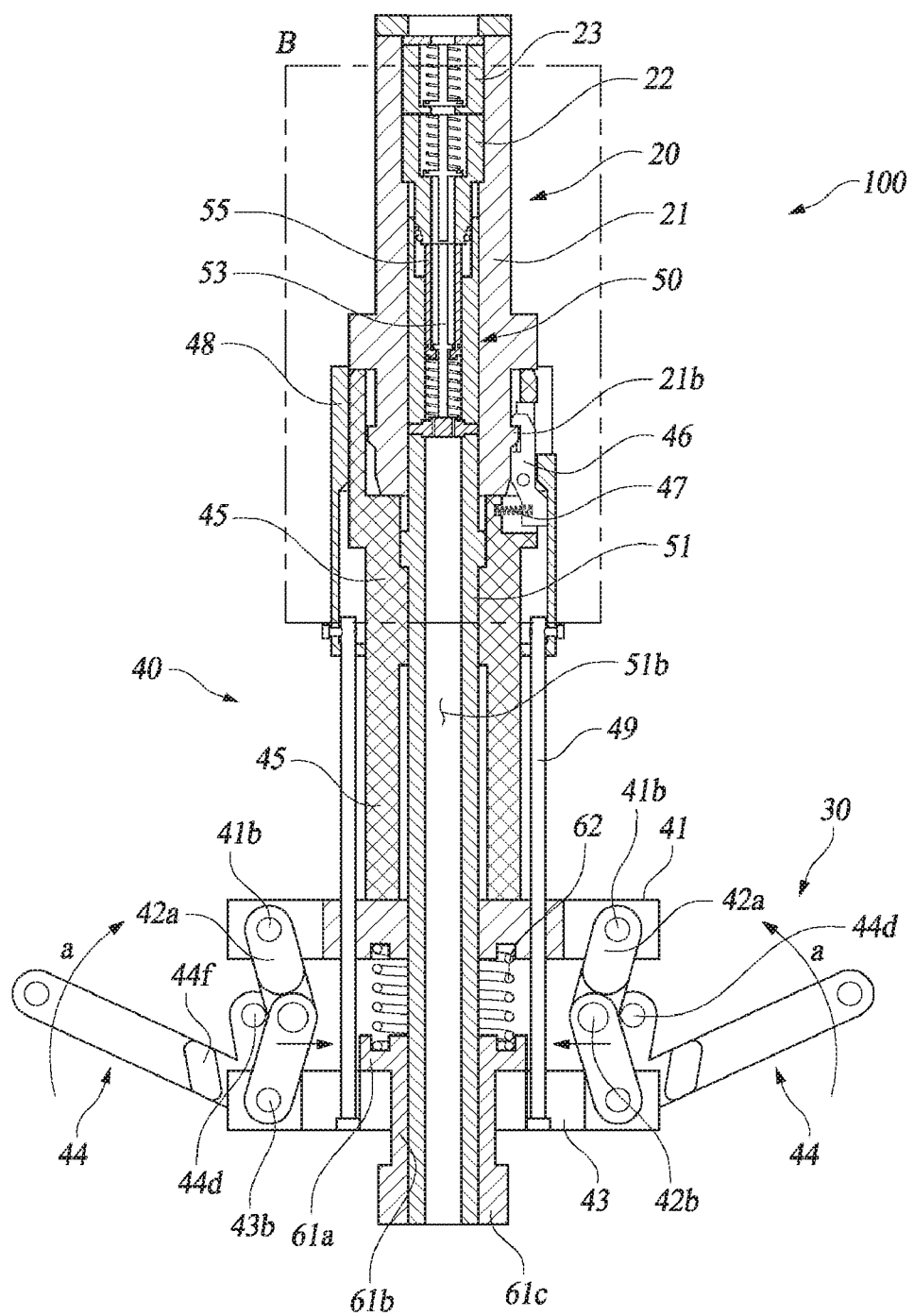

The extension portion 44a extends from the support pin 43b, and, when a user turns the handle 44c in the direction indicated by arrow a while holding the handle 44c, outputs and transmits turning moment to the power transmission portion 44b. The power transmission portion 44b is connected to the extension portion 44a so as to have an acute angle (40 degrees to 60 degrees) therebetween, and applies the turning moment received from the extension portion to the bending rod 44 such that the bending rod 44 bends the bending link unit 42 inwards, as shown in FIG. 8. As the bending link unit 42 is bent, the distance between the reference plate and the upward-downward movement plate is adjusted.

Reference symbol 44f indicates stopping protrusions. The stopping protrusions 44f are protrusions configured to be caught by opposite ends of the upward-downward movement plate 43, and prevent the lever 44 from being turned in the direction opposite the direction indicated by arrow a.

FIGS. 6 to 11 are sectional views illustrating the operation of the liquefied hydrogen filling apparatus 100 according to the embodiment of the present invention.

Figure 9:
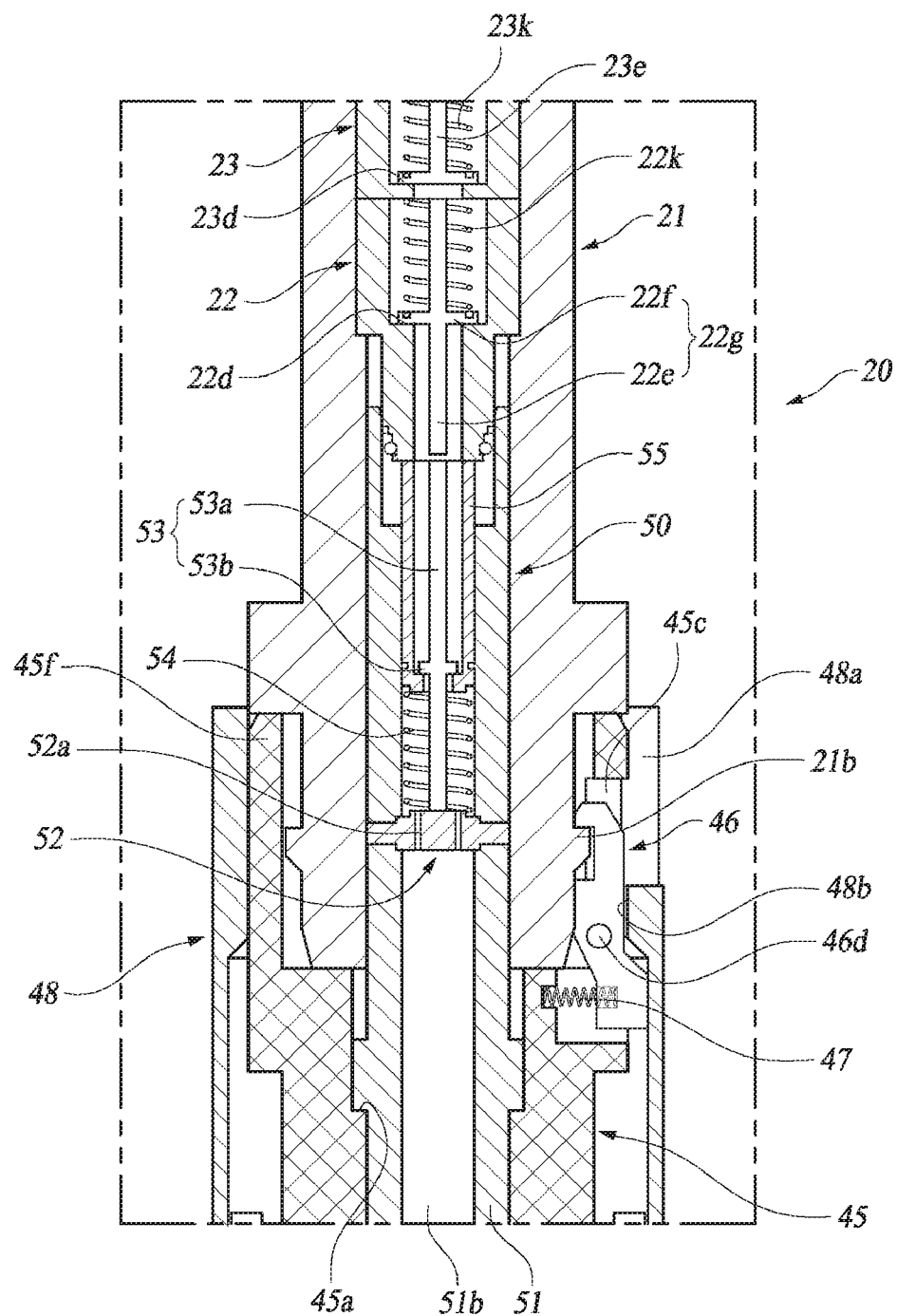
Figure 10:
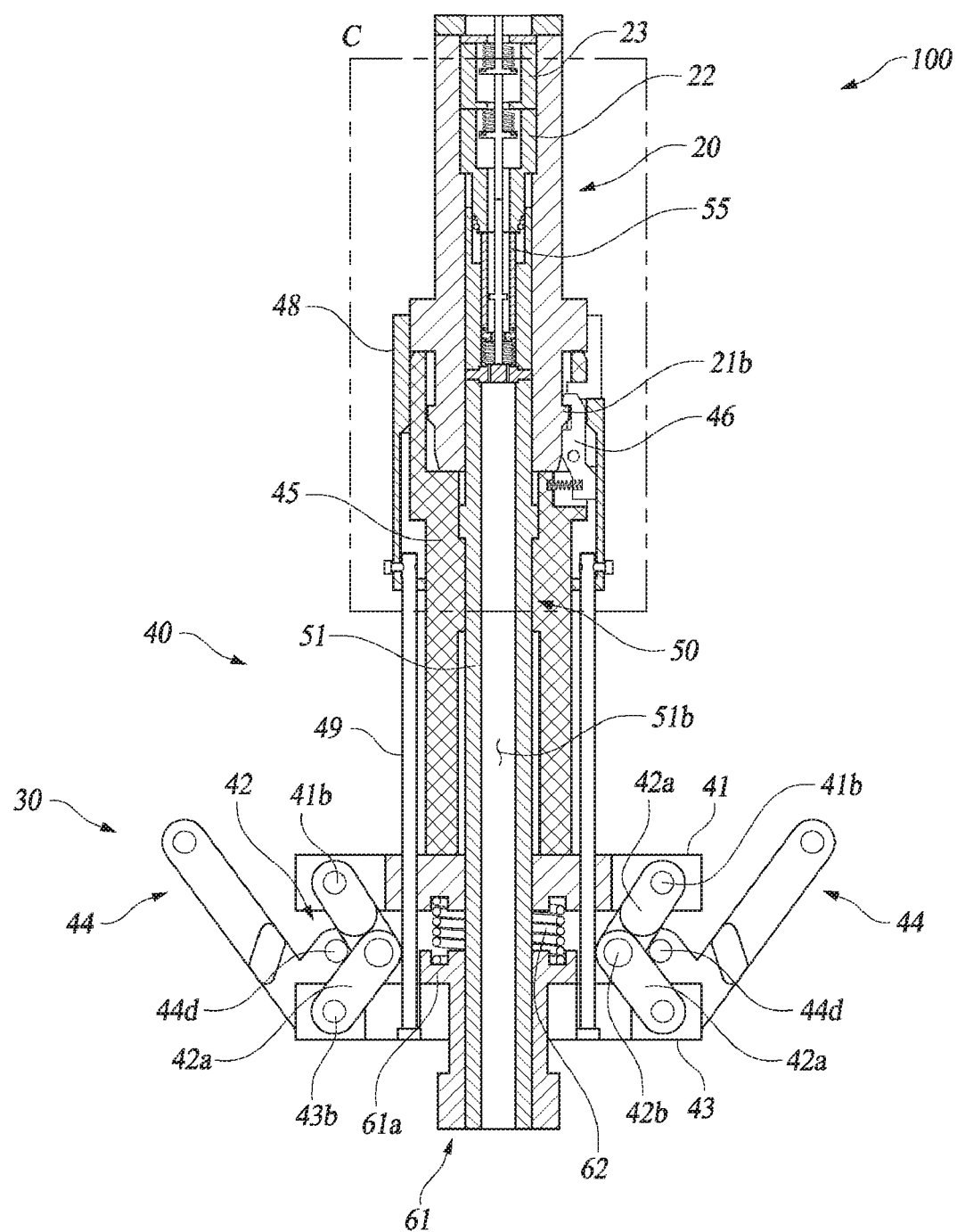

FIG. 6 shows the state in which the receptacle 20 is inserted in the receptacle reception portion 45f, and FIG. 8 shows the state in which the receptacle 20 is fixed by the elastic locker 46. In addition, FIG. 10 shows the internal structure of the liquefied hydrogen filling apparatus at the time of filling of liquefied hydrogen. Furthermore, FIG. 7 is an enlarged view showing part A of FIG. 6, FIG. 9 is an enlarged view showing part B of FIG. 8, and FIG. 11 is an enlarged view showing part C of FIG. 10.

Referring first to FIG. 6, it can be seen that the lower end of the stationary duct 21 of the receptacle 20 is inserted in the receptacle reception portion 45f and that the sliding valve 50 is inserted in the guide path 21a of the stationary duct 21 in the state of being maximally moved downwards. At this time, the upper end of the inner cylinder 55 abuts the valve case 22m. In addition, the lower-end catching portion 61c abuts the lower surface of the upward-downward movement plate 43.

When each lever 44 is turned in the direction indicated by arrow a in the above state, as shown in FIG. 8, the bending link unit 42 is bent inwards, whereby the upward-downward movement plate 43 is moved upwards. At this time, the movement limiting drum 61 is not moved. While the upward-downward movement plate 43 is moved upwards, the connecting rod 49 and the locker support case 48 are also moved upwards. As a result, the locker support case 48 supports the elastic locker 46 against the catching ring 21b, whereby coupling of the multistage opening and closing device 40 to the receptacle 20 is completed. Unless the lever 44 is turned in the opposite direction, the multistage opening and closing device 40 is not separated from the receptacle 20.

When the lever 44 is further turned in the state in which mounting of the multistage opening and closing device 40 is completed, the upward-downward movement plate 43 moves the movement limiting drum 61 upwards, whereby the sliding valve 50 is moved upwards to the first stationary valve 22. As sliding valve 50 is moved to the first stationary valve 22, as described above, the sliding valve 50 and the first and second stationary valves 22 and 23 are all opened. As soon as the valves are opened, liquefied hydrogen is supplied into the storage tank 11.

When the lever 44 is turned in the opposite direction in order to interrupt the supply of liquefied hydrogen, a supply channel is blocked by elastic restoring force of the cylinder seat spring 54 of the sliding valve 50 and the springs 22k and 23k of the first and second stationary valves 22 and 23. In addition, when the lever 44 is further turned, the locker support case 48 is moved downwards, whereby the elastic locker 46 is separated from the catching ring 21b, and therefore the multistage opening and closing device 40 may be separated from the receptacle 20.

As is apparent from the above description, in the liquefied hydrogen filling apparatus according to the present invention constructed as described above, connection between liquefied hydrogen injection lines is performed stepwise, whereby there is no concern of leakage of liquefied hydrogen the moment the liquefied hydrogen injection lines are connected to each other, and therefore it is possible to guarantee safety and to prevent loss of fuel.

In addition, the state of connection between the liquefied hydrogen injection lines is securely maintained, whereby there is no concern of separation due to internal pressure at the time of filling or other external force, and therefore it is possible to perform safe filling.

Although the present invention has been described in detail based on the concrete embodiment, those skilled in the art will appreciate that the present invention is not limited thereto and that various modifications, additions, and substitutions are possible without departing from the scope and spirit of the invention as disclosed in the accompanying claims.

What is claimed is:

1. A liquefied hydrogen filling apparatus comprising:
   a receptacle mounted to a liquefied hydrogen storage tank, the receptacle having mounted therein a blocking unit configured to be opened by external force; and a multistage opening and closing device detachably coupled to the receptacle, the multistage opening and closing device having:

a housing configured to define a central path extending in a longitudinal direction, the housing having a receptacle reception portion configured to receive a portion of the receptacle, the receptacle reception portion being formed at an upper end of the housing;

a lock supported by the housing, the lock being configured to fix the receptacle received in the receptacle reception portion to the housing;

a sliding valve installed in the central path of the housing so as to be slidable in the longitudinal direction, said sliding valve having a tubular rectilinear body configured to abut an inner circumferential surface of the central path of the housing, the tubular rectilinear body defining an in-body path configured to allow liquefied hydrogen to pass therethrough, a portion of the tubular rectilinear body of the sliding valve extending outwards from the central path, the sliding valve being configured to be opened by external force transmitted from the receptacle; and a driving unit mounted to a lower end of the housing, the driving unit being configured to drive the lock first in order to fix the receptacle, to move the sliding valve to the blocking unit such that the sliding valve is opened by reaction force from the blocking unit, and simultaneously to drive the sliding valve such that the sliding valve pushes open the blocking unit.

2. The liquefied hydrogen filling apparatus according to claim 1, wherein the receptacle has a stationary duct provided with a guide path having a predetermined inner diameter, the stationary duct being provided on an outer circumferential surface thereof with a catching ring configured to be caught and supported by the lock, and the blocking unit has a first stationary valve, the first stationary valve comprising:

a valve casing fixed in the guide path, the valve casing defining a valve path, the valve casing having a step portion formed therein, the valve casing being configured to apply reaction force to the sliding valve;

a movable shutter installed in the valve path, the movable shutter having an extension rod extending in the longitudinal direction and a blocking plate formed integrally with the extension rod, the blocking plate being configured to advance to or retreat from the step portion, the blocking plate being in tight contact with the step portion to block the valve path, the movable shutter being configured to be pushed by the sliding valve in order to open the step portion; and a spring configured to elastically support the blocking plate against the step portion.

3. A liquefied hydrogen filling apparatus comprising, a receptacle mounted to a liquefied hydrogen storage tank, the receptacle having mounted therein a blocking unit configured to be opened by external force; and a multistage opening and closing device detachably coupled to the receptacle, the multistage opening and closing device having:

a housing configured to define a central path extending in a longitudinal direction, the housing having a receptacle reception portion configured to receive a portion of the receptacle, the receptacle reception portion being formed at an upper end of the housing;

a lock supported by the housing, the lock being configured to fix the receptacle received in the receptacle reception portion to the housing;

a sliding valve installed in the central path of the housing so as to be slidable in the longitudinal direction, a portion of the sliding valve extending outwards from the central path, the sliding valve being configured to be opened by external force transmitted from the receptacle; and a driving unit mounted to a lower end of the housing, the driving unit being configured to drive the lock first in order to fix the receptacle, to move the sliding valve to the blocking unit such that the sliding valve is opened by reaction force from the blocking unit, and simultaneously to drive the sliding valve such that the sliding valve pushes open the blocking unit, wherein the receptacle has a stationary duct provided with a guide path having a predetermined inner diameter, the stationary duct being provided on an outer circumferential surface thereof with a catching ring configured to be caught and supported by the lock, and the blocking unit has a first stationary valve, the first stationary valve comprising:

a valve casing fixed in the guide path, the valve casing defining a valve path, the valve casing having a step portion formed therein, the valve casing being configured to apply reaction force to the sliding valve;

a movable shutter installed in the valve path, the movable shutter having an extension rod extending in the longitudinal direction and a blocking plate formed integrally with the extension rod, the blocking plate being configured to advance to or retreat from the step portion, the blocking plate being in tight contact with the step portion to block the valve path, the movable shutter being configured to be pushed by the sliding valve in order to open the step portion; and a spring configured to elastically support the blocking plate against the step portion, and wherein a second stationary valve is further installed in the guide path, the second stationary valve being arranged with respect to the first stationary valve in series, the second stationary valve being configured to be pushed by the extension rod so as to be opened simultaneously with the first stationary valve.

4. The liquefied hydrogen filling apparatus according to claim 2, wherein the lock comprises:

an elastic locker installed in the receptacle reception portion such that a position of the elastic locker is adjustable, the elastic locker being opposite the catching ring of the receptacle inserted in the receptacle reception portion;

a spring configured to apply elastic force to the elastic locker such that the elastic locker is separated from the catching ring; and a locking realization unit configured to be movable rectilinearly in a state of wrapping the receptacle reception portion and to support the elastic locker against the receptacle through rectilinear movement in order to fix the receptacle or to allow action of the spring to be applied to the elastic locker such that the elastic locker is separated from the catching ring.

5. A liquefied hydrogen filling apparatus comprising, a receptacle mounted to a liquefied hydrogen storage tank, the receptacle having mounted therein a blocking unit configured to be opened by external force; and a multistage opening and closing device detachably coupled to the receptacle, the multistage opening and closing device having:

a housing configured to define a central path extending in a longitudinal direction, the housing having a receptacle reception portion configured to receive a portion of the receptacle, the receptacle reception portion being formed at an upper end of the housing;

a lock supported by the housing, the lock being configured to fix the receptacle received in the receptacle reception portion to the housing;

a sliding valve installed in the central path of the housing so as to be slidable in the longitudinal direction, a portion of the sliding valve extending outwards from the central path, the sliding valve being configured to be opened by external force transmitted from the receptacle; and a driving unit mounted to a lower end of the housing, the driving unit being configured to drive the lock first in order to fix the receptacle, to move the sliding valve to the blocking unit such that the sliding valve is opened by reaction force from the blocking unit, and simultaneously to drive the sliding valve such that the sliding valve pushes open the blocking unit, wherein the receptacle has a stationary duct provided with a guide path having a predetermined inner diameter, the stationary duct being provided on an outer circumferential surface thereof with a catching ring configured to be caught and supported by the lock, and the blocking unit has a first stationary valve, the first stationary valve comprising:

a valve casing fixed in the guide path, the valve casing defining a valve path, the valve casing having a step portion formed therein, the valve casing being configured to apple reaction force to the sliding valve;

a movable shutter installed in the valve path, the movable shutter having an extension rod extending in the longitudinal direction and a blocking plate formed integrally with the extension rod, the blocking plate being configured to advance to or retreat from the step portion, the blocking plate being in tight contact with the step portion to block the valve path, the movable shutter being configured to be pushed by the sliding valve in order to open the step portion; and a spring configured to elastically support the blocking plate against the step portion, and wherein the lock comprises:

an elastic locker installed in the receptacle reception portion such that a position of the elastic locker is adjustable, the elastic locker being opposite the catching ring of the receptacle inserted in the receptacle reception portion;

a spring configured to apply elastic force to the elastic locker such that the elastic locker is separated from the catching ring; and a locking realization unit configured to be movable rectilinearly in a state of wrapping the receptacle reception portion and to support the elastic locker against the receptacle through rectilinear movement in order to fix the receptacle or to allow action of the spring to be applied to the elastic locker such that the elastic locker is separated from the catching ring, and wherein a plurality of side paths configured to open an inner space of the receptacle reception portion in a lateral direction is formed in the receptacle reception portion, the elastic locker is installed in each of the side paths so as to be turnable about a turning pin, the elastic locker being provided at an upper end thereof with a hook configured to fix the catching ring by catching the catching ring, and the spring is an extension spring configured to connect a lower end of the elastic locker and the housing to each other.

6. The liquefied hydrogen filling apparatus according to claim 5, wherein the locking realization unit comprises:

a locker support case configured to contact an outer circumferential surface of the receptacle reception portion surface-to-surface, the locker support case being provided at a position thereof corresponding to each of the side paths with a locker retreat recess defining a retreat space in which the elastic locker can be separated from the catching ring; and a case moving unit configured to move the locker support case such that the hook is pushed by an inner circumferential surface of the locker support case so as to protrude inwardly of the receptacle reception portion or to retreat into the locker retreat recess.

7. The liquefied hydrogen filling apparatus according to claim 6, wherein the sliding valve has:

a tubular rectilinear body configured to abut an inner circumferential surface of the central path of the housing, the rectilinear body defining an in-body path configured to allow liquefied hydrogen to pass therethrough;

a baffle plate fixed in the rectilinear body, the baffle plate having a plurality of baffle plate holes;

a valve body comprising a push rod fixed to the baffle plate, the push rod extending to the first stationary valve, and a blocking disc formed integrally with the push rod, the blocking disc having a disc shape;

an inner cylinder installed in the in-body path of the rectilinear body so as to be slidable, the inner cylinder being configured to receive the blocking disc and a portion of the push rod, the inner cylinder having an opening and closing hole configured to be opened and closed by the blocking disc such that liquefied hydrogen passes through the opening and closing hole, the inner cylinder being separated from the blocking disc by reaction force from the valve casing of the first stationary valve when the sliding valve is moved to the first stationary valve; and a spring configured to elastically support the inner cylinder against the first stationary valve such that the opening and closing hole is blocked by the blocking disc in a state in which no reaction force is applied.

8. The liquefied hydrogen filling apparatus according to claim 7, wherein the push rod of the valve body is located on a straight line of the extension rod of the first stationary valve, whereby the sliding valve is moved to the first stationary valve so as to be opened by the reaction force, and then the extension rod of the first stationary valve is moved by pushing such that the blocking plate is separated from the step portion to open the first stationary valve.

9. The liquefied hydrogen filling apparatus according to claim 8, wherein the driving unit comprises:

a reference plate fixed to a lower end of the housing, the reference plate being configured to allow the sliding valve to extend through a central through-hole;

an upward-downward movement plate disposed so as to be spaced apart from the reference plate;

a bending link unit configured to connect the reference plate and the upward-downward movement plate to each other so as to be capable of adjusting a distance therebetween;

a movement limiting drum interposed between the sliding valve and the upward-downward movement plate, the movement limiting drum being configured to limit a distance of movement of the sliding valve relative to the upward-downward movement plate; and a lever configured to slide the sliding valve through adjustment of the distance between the reference plate and the upward-downward movement plate in order to open the sliding valve and the first stationary valve.

10. The liquefied hydrogen filling apparatus according to claim 9, wherein the upward-downward movement plate is provided with a center hole, and the movement limiting drum has:

a sliding portion fixed to a lower end of the rectilinear body, the sliding portion being configured to be slidable in a state of being received in the center hole;

an upper-end catching portion fixed to an upper end of the sliding portion, the upper-end catching portion being configured to be caught by an upper surface of the upward-downward movement plate; and a lower-end catching portion located at a lower end of the sliding portion, the lower-end catching portion being configured to be caught by a lower surface of the upward-downward movement plate.

11. The liquefied hydrogen filling apparatus according to claim 10, wherein a drum support spring is provided between the reference plate and the movement limiting drum, the drum support spring being configured to apply elastic force to the movement limiting drum in a state in which the drum support spring is supported by the reference plate, the drum support spring having a standard configured such that the lower-end catching portion abuts a lower surface of the upward-downward movement plate in a state in which the upward-downward movement plate is maximally spaced apart from the reference plate.

12. The liquefied hydrogen filling apparatus according to claim 11, wherein the case moving unit comprises a plurality of connecting rods extending parallel to the housing, an upper end of each of the connecting rods being fixed to the locker support case, a lower end of each of the connecting rods being fixed to the upward-downward movement plate through the reference plate.

13. The liquefied hydrogen filling apparatus according to claim 12, wherein the lever is configured to perform a first step operation in which the lever moves the upward-downward movement plate to the reference plate until the upper surface of the upward-downward movement plate reaches the upper-end catching portion such that the locker support case supports the elastic locker against the receptacle, and the lever is also configured to perform a second step operation in which the lever moves the upward-downward movement plate to the reference plate again after completion of the first step operation such that the upward-downward movement plate pushes the sliding valve to the first stationary valve through the movement limiting drum, whereby the sliding valve is moved to the first stationary valve.

14. The liquefied hydrogen filling apparatus according to claim 8, wherein the bending link unit comprises:

a plurality of unit links, one end of each of the unit links being connected to a corresponding one of the reference plate and the upward-downward movement plate via a support pin; and a link pin configured to connect the other ends of the unit links to each other.

15. The liquefied hydrogen filling apparatus according to claim 14, wherein the lever is installed at each end of the upward-downward movement plate, and the lever comprises:

a pair of extension portions turnably installed at an end of the upward-downward movement plate;

power transmission portions, each of the power transmission portions being connected to a corresponding one of the extension portions so as to have an acute angle therebetween, each of the power transmission portions being configured to receive turning moment of a corresponding one of the extension portions; and a bending rod configured to connect ends of the power transmission portions to each other and to transmit the turning moment of each of the extension portions to the bending link unit such that the bending link unit is bent in order to adjust a distance between the reference plate and the upward-downward movement plate.

* * * * *